(12) United States Patent
Volk (10) Patent No.: US 9,204,761 B2
(45) Date of Patent: Dec. 8, 2015

(54) PORTABLE TOOTHBRUSH HOLDER

(71) Applicant: Donald J. Volk, Turlock, CA (US)

(72) Inventor: Donald J. Volk, Turlock, CA (US)

( * ) Notice: Subject to any disclaimer, the term of this patent is extended or adjusted under 35 U.S.C. 154(b) by 0 days.

(21) Appl. No.: 14/616,038

(22) Filed: Feb. 6, 2015

(65) Prior Publication Data

US 2015/0150420 A1   Jun. 4, 2015

Related U.S. Application Data

(63) Continuation-in-part of application No. 13/491,713, filed on Jun. 8, 2012, now abandoned.

(60) Provisional application No. 61/498,006, filed on Jun. 17, 2011.

(51) Int. Cl.
| | |
|---|---|
| *A47B 81/02* | (2006.01) |
| *A47K 1/09* | (2006.01) |
| *F16M 11/20* | (2006.01) |
| *F16M 11/04* | (2006.01) |
| *F16M 11/24* | (2006.01) |
| *A46B 9/04* | (2006.01) |

(52) U.S. Cl.
CPC ... *A47K 1/09* (2013.01); *A46B 9/04* (2013.01); *F16M 11/04* (2013.01); *F16M 11/2014* (2013.01); *F16M 11/24* (2013.01)

(58) Field of Classification Search
CPC ....... A47K 1/09; A46B 9/04; F16M 11/2014; F16M 11/04; F16M 11/24
USPC ............... 211/65, 66, 69, 69.1, 69.2, 69.4, 211/119.005, 119.009, 196; 206/361, 362, 206/362.1, 362.2, 15.2, 209, 209.1; 248/109, 110
See application file for complete search history.

(56) References Cited

U.S. PATENT DOCUMENTS

| | | | | | |
|---|---|---|---|---|---|
| 323,420 | A | * | 8/1885 | Hills | 220/23.87 |
| 333,900 | A | * | 1/1886 | Tatum | 211/65 |
| 397,723 | A | * | 2/1889 | Jones | 211/66 |
| 1,093,505 | A | * | 4/1914 | Volz | 222/577 |
| 1,676,756 | A | * | 7/1928 | Weichsel | 206/362.1 |
| 2,883,992 | A | * | 4/1959 | Hastings | 131/235.1 |
| 2,902,145 | A | * | 9/1959 | Wagner | 206/362.1 |
| 3,233,743 | A | * | 2/1966 | Di Tirro | 211/65 |
| 3,966,055 | A | * | 6/1976 | Francavilla | 211/65 |
| 4,688,685 | A | * | 8/1987 | Brace | 211/70.5 |
| 4,795,710 | A | * | 1/1989 | Muszak et al. | 422/64 |
| 4,995,511 | A | * | 2/1991 | Evans | 206/362.1 |
| 4,997,629 | A | * | 3/1991 | Marchand et al. | 422/300 |
| 5,301,799 | A | * | 4/1994 | Gurba, Jr. | 206/1.7 |
| 5,522,497 | A | * | 6/1996 | Stacy | 206/209.1 |
| 5,566,823 | A | * | 10/1996 | Summers | 206/209.1 |
| 5,630,505 | A | * | 5/1997 | Garcia | 206/362.1 |
| 5,661,865 | A | * | 9/1997 | Humphrey | 15/3 |
| 5,687,855 | A | * | 11/1997 | Heller | 211/65 |

(Continued)

*Primary Examiner* — Joshua J Michener
*Assistant Examiner* — Devin Barnett
(74) *Attorney, Agent, or Firm* — Laurence P. Colton; Smith Risley Tempel Santos LLC (57) ABSTRACT

A portable toothbrush holder transformable between a first, storage state and a second, erected state, the portable toothbrush holder having a base component having a spindle connection feature; a top component having a spindle connection feature; and a spindle component; the base component, top component and spindle component being separable; and when the portable toothbrush holder is in the second, erected state when the spindle connection features of the base component and top component receive opposite ends of the spindle component.

13 Claims, 9 Drawing Sheets

(56) References Cited

U.S. PATENT DOCUMENTS

| | | | |
|---|---|---|---|
| 5,709,301 A * | 1/1998 | Couch et al. | 206/361 |
| 5,772,050 A * | 6/1998 | Shih | 211/39 |
| 5,829,603 A * | 11/1998 | Martineau | 211/66 |
| 6,457,593 B1 * | 10/2002 | Hsu | 211/69.1 |
| 6,601,699 B1 * | 8/2003 | Naredo | 206/209.1 |
| 6,641,321 B2 * | 11/2003 | Horng | 401/272 |
| 6,935,515 B1 * | 8/2005 | Sookoo | 211/65 |
| 7,090,072 B1 * | 8/2006 | Elliott | 206/15.3 |
| 7,228,976 B2 * | 6/2007 | Pretorius | 211/65 |
| D570,144 S * | 6/2008 | Scofield | D6/534 |
| 7,617,927 B1 * | 11/2009 | Smith, Jr. | 206/15.3 |
| 7,951,343 B1 * | 5/2011 | Davis | 422/300 |
| 8,051,994 B2 * | 11/2011 | Jin et al. | 211/163 |
| 8,186,524 B2 * | 5/2012 | Siahpush | 211/196 |
| 2003/0010728 A1 * | 1/2003 | Lanman et al. | 211/10 |
| 2003/0232177 A1 * | 12/2003 | Pearce | 428/188 |
| 2004/0081507 A1 * | 4/2004 | Kitao et al. | 401/219 |
| 2005/0121352 A1 * | 6/2005 | Kim et al. | 206/579 |
| 2005/0167379 A1 * | 8/2005 | Hoy | 211/66 |
| 2006/0186068 A1 * | 8/2006 | Bewsky | 211/69.1 |
| 2009/0014399 A1 * | 1/2009 | Bott | 211/85.12 |
| 2009/0200184 A1 * | 8/2009 | Cullen | 206/362.2 |
| 2009/0242442 A1 * | 10/2009 | Kaddissi | 206/362.3 |
| 2010/0326932 A9 * | 12/2010 | Morris et al. | 211/65 |
| 2011/0174823 A1 * | 7/2011 | Silva | 220/476 |
| 2011/0198454 A1 * | 8/2011 | Volk | 248/111 |
| 2012/0285387 A1 * | 11/2012 | Humphries et al. | 119/53 |

* cited by examiner

PORTABLE TOOTHBRUSH HOLDER

STATEMENT OF RELATED APPLICATIONS

This patent application is a continuation-in-part of U.S. patent application Ser. No. 13/491,713 having a filing date of 8 Jun. 2012, which claims priority on U.S. Provisional Patent Application No. 61/498,006 having a filing date of 17 Jun. 2011.

BACKGROUND OF THE INVENTION

1. Technical Field

This invention relates generally to containers and stands for holding and supporting elongated items and relates more specifically to disposable containers and stands for holding and supporting toothbrushes.

2. Prior Art

As society learned that harmful bacteria prevail on many bathroom surfaces, efforts began to keep toothbrushes, and in particular the moist bristle ends of toothbrushes, out of contact with these surfaces. The result of one such effort is the humble toothbrush holder.

Toothbrush holders prevent toothbrushes from contacting countertops and sink surfaces. Consequently, many homes today contain permanent toothbrush holders useful for suspending toothbrushes above countertops and away from harmful bacteria potentially residing thereon. The usefulness of a device for keeping toothbrushes off of sink surfaces, such as a toothbrush holder, is not only understood but also encouraged by the medical community.

Despite the acknowledged benefits of segregating one's toothbrush from bathroom surfaces, many users only employ a toothbrush holder when at home. That is, when travelling away from home, a user is often relegated to putting a toothbrush in a drinking glass or laying a toothbrush on a hotel washcloth, napkin or facial tissue to keep the toothbrush from coming in contact with a potentially unclean surface.

Toothbrush holders are known, especially ceramic and plastic toothbrush holders present in the household bathroom. Toothbrush holders hold and support toothbrushes off of the counter for both health and aesthetic reasons. A vertically supported toothbrush dries more quickly and accumulates fewer germs than a toothbrush lying on the bathroom sink counter, and just looks better.

Hotels, inns, time shares, cruise ships, medical facilities and the like typically do not provide a toothbrush holder and patrons have a choice: prop their toothbrush up in a glass, leave the toothbrush lying on the counter, place the toothbrush on a towel, or dry the toothbrush and place it back in the toiletry kit. None of these options are particularly appealing.

Various toothbrush holders, disposable and non-disposable, have been developed. Several representative devices include:

U.S. Pat. No. 2,902,145 to Wagner discloses a flat, compact case having a plurality of apertures in an upper wall through which the shanks or handles of toothbrushes may be extended, the case standing upright on a suitable surface, and with the heads of the brushes extended above the top of the case. The device further contemplates the provision of a trough-shaped bottom for maintaining the brushes uniformly in place in the holder and which bottom is provided with openings for drainage purposes.

U.S. Pat. No. 3,233,743 to Di Tirro discloses a molded one piece box-like rack having a pair of parallel integral sides and back and adapted to be mounted in vertical planes. The spaced sides include cooperating pairs of downwardly inclined horizontally aligned slots for supporting a comb therein.

U.S. Pat. No. 5,687,855 to Heller discloses a disposable toothbrush holder, particularly for the convenience and hygiene of visitors in motels and hotels, holds toothbrushes upright, bristle end up, for sanitary drying, supported in circular openings in a convex upper portion supported by integrally-formed legs. The holders can be molded economically from recyclable plastic material, and can be nested together for space-efficient packaging.

U.S. Pat. No. 7,228,976 to Pretorius discloses a toothbrush holder including a single piece of sheet material including spaced first and second end edges. A single fold area across the sheet material defines a holder portion and a base portion. The holder portion terminates in the first end edge and has a length relative to the base portion to impart a smooth sloping curvature to the holder portion without fold lines when the toothbrush holder is deployed. The base portion terminates at the second end edge. At least one toothbrush receiving orifice in the holder portion is sized to receive the shaft of the toothbrush. A key extends outwardly from the second edge, and a lock for receiving the key is disposed in the holder portion. The lock is spaced from the first end edge to angle the base portion and to deploy and support the holder portion in a position spaced from the base portion with the orifice in the base portion elevated.

U.S. Design Pat. No. D570,144 to Scofield discloses an ornamental design for a disposable toothbrush holder that, in effect, has the appearance of a birdhouse or small house. The design has at least one hole in the "roof" of the design through which a toothbrush may be placed and held in a generally vertical orientation.

Therefore, what is needed in the art is a convenient, portable toothbrush holder that can be used to separate a toothbrush from a surface. Further, what is needed in the art is a portable toothbrush holder that can be transformed from a compact, travel state to an erected state useful for suspending one or more toothbrushes. Even further, what is needed in the art is a portable toothbrush holder that can be leveraged to place one or more toothbrushes in a proper position for drying, as repacking a toothbrush in a travel kit or suitcase before it has dried properly may promote bacteria growth.

There is thus a need for an inexpensive disposable toothbrush holder for meeting the needs of travelers, hotels and other inns, cruise ships, travel kits, households, hospitals and other medical facilities, camps, schools, emergency management organizations, and the like.

BRIEF SUMMARY OF THE INVENTION

Briefly, the disclosed embodiments, as well as features and aspects thereof, are directed towards providing a portable toothbrush holder. Embodiments of a portable toothbrush holder may be transformable between a first, compact state useful for transport and storage and a second, erected state useful for supporting one or more toothbrushes above a surface. For example, in a temporary lodging environment, embodiments of a portable toothbrush holder may be transformed into an erected state such that a user is provided with a convenient place for drying one or more toothbrushes while protecting them from potentially unclean, public surfaces.

One exemplary application of a portable toothbrush holder is in a temporary lodging environment. When a user arrives at a hotel, hospital, or other temporary lodging, for example, the user may have no convenient way to protect, store, or dry a toothbrush. Embodiments of a portable toothbrush holder solve these common travel issues as they are easy to transport away from home in a first, compact travel state and assemble on site into a second, erected state. Once in the erected state, embodiments can receive a user's toothbrush, keep the toothbrush off the counter or sink surfaces, and allow the toothbrush to dry properly.

One exemplary embodiment of a portable toothbrush holder includes a base, a top, and a connecting spindle. The exemplary embodiment may be broken down into a first state for transportation or storage, and reassembled into a second, erected state for use. The base and top components may be configured to simultaneously receive the spindle component at its opposite ends to assemble the device into the erected, second state. Notably, when in the erected, second state, the portable toothbrush holder may be able to receive one or more toothbrushes such that the toothbrushes remain segregated from each other as well as the surface upon which the portable toothbrush holder resides.

When in the erected state, a received toothbrush may be retained by the top component of the exemplary portable toothbrush holder working in conjunction with the base component. That is, the top component may be able to receive a toothbrush through a toothbrush retention feature (such as a hole, for example) while the base component receives the end of the toothbrush handle into a complimentary toothbrush retention feature (such as a recess, for example). Once a toothbrush is received into an erected embodiment of a portable toothbrush holder, the neck of the received toothbrush may rest against the edge of the top component toothbrush retention feature while the distal end of toothbrush handle is lodged in the complimentary base component retention feature.

The retention feature of the base component of the exemplary embodiment may include a circular depression generally defined by an outer circumferential wall useful for receiving and retaining the handle of a toothbrush when the embodiment is in the erected state. Additionally, some embodiments of a portable toothbrush holder may include radial ridges positioned to split the circular depression of the base component into two or more sections, each section being able to receive and retain the handle of a toothbrush. Advantageously, by partitioning the circular depression of the base component with radial ridges or the like, a portable toothbrush holder may be able to receive the handle end of a toothbrush into each partitioned section such that a plurality of toothbrushes received into the embodiment are segregated from each other.

The retention feature of the base component in another exemplary embodiment may include individual depressions located so as to cooperate with a toothbrush retention feature (such as a hole, for example). In such an embodiment, the individual depressions are analogous to the two or more sections formed by the combination of the circular depression, the outer circumferential wall, and the radial ridges. For example, bottoms of the depressions correspond to the circular depression, one or more outer walls of the depressions correspond to the outer circumferential wall, and one or more side walls or inner walls of the depressions located between adjacent depressions correspond to the radial ridges.

Further, in certain embodiments, the base and/or top components may have a recess or saddle feature, or features, useful for receiving the spindle when the device is in the first, disassembled state for transportation or storage, i.e., the storage state. Moreover, when in the storage state, the top component may communicate with the base component such that the spindle is securely held in the saddle feature(s).

Notably, some embodiments of a portable toothbrush holder might be constructed of a material suitable for exposure to cleaning and sanitizing techniques. It is envisioned, however, that other embodiments may be constructed of a disposable or recyclable material.

These features, and other features and advantages of the present invention, will become more apparent to those of ordinary skill in the relevant art when the following detailed description of the preferred embodiments is read in conjunction with the appended drawings in which like reference numerals represent like components throughout the several views

DETAILED DESCRIPTION OF PREFERRED EMBODIMENTS

The presently disclosed embodiments, as well as features and aspects thereof, are directed towards providing a portable toothbrush holder for keeping one or more toothbrushes from coming into contact with a counter or other surface. Embodiments of a portable toothbrush holder may be transformable between a first, compact state useful for transport and/or storage, and a second, erected state useful for supporting one or more toothbrushes above the surface.

As will become apparent from a review of the drawings and the following description, a portable toothbrush holder may be collapsed in a first state for ease of transport and/or storage and then reassembled in a second, erected state for use upon arrival at a destination. Notably, a portable toothbrush holder may prevent a user's toothbrush from coming in contact with bacteria, germs, dirt, and/or other contaminants that may be on a counter or sink surface upon which the portable toothbrush holder resides. Moreover, a portable toothbrush holder may also provide for a toothbrush to dry properly if left in the holder for a sufficient period of time. As is understood by one of ordinary skill in the art, proper drying of a toothbrush before storage may mitigate or prevent the growth of harmful bacteria, mold, or fungus on the toothbrush.

Figure 1:
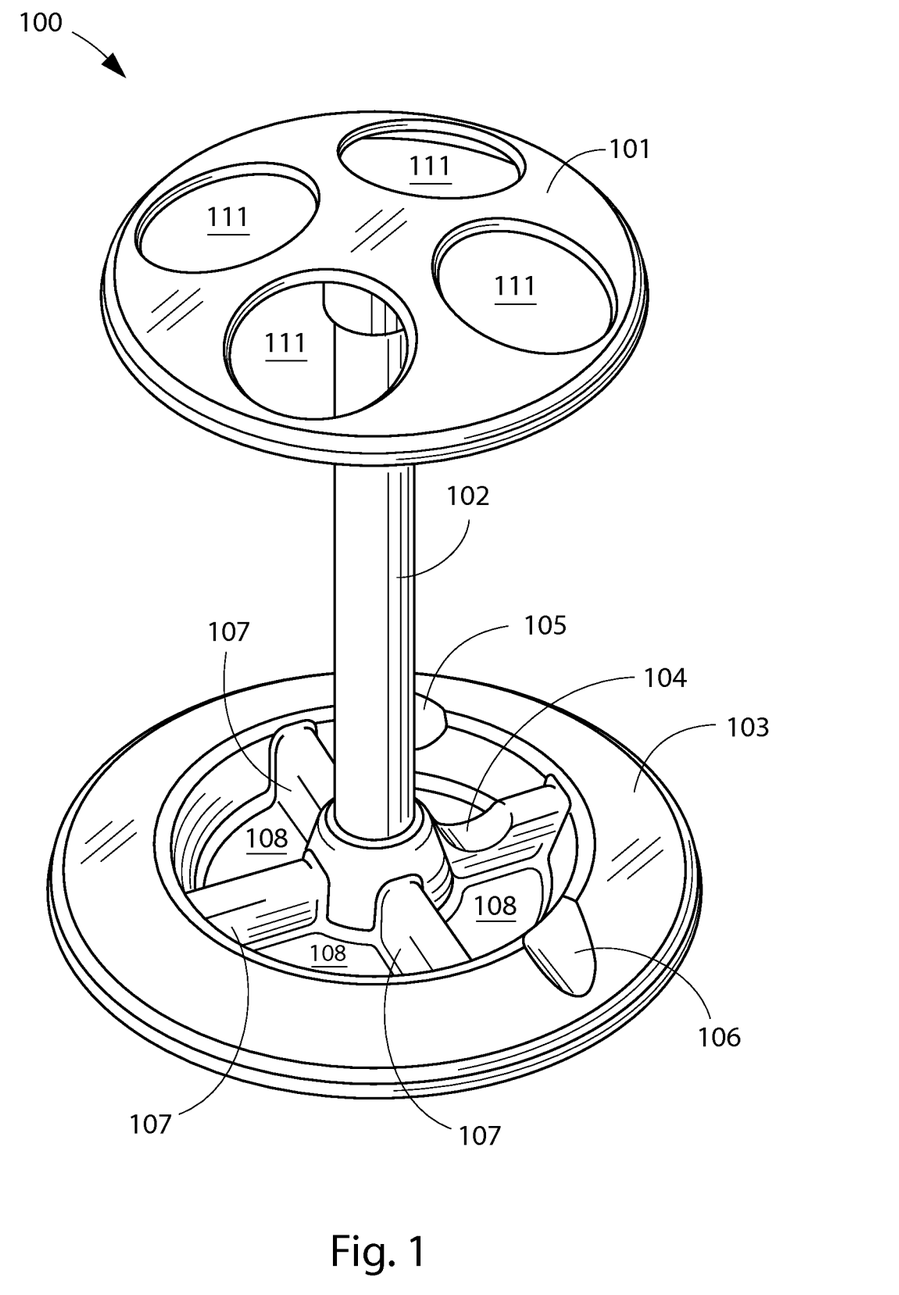
FIG. 1 is a perspective view of an exemplary portable toothbrush holder, depicted in an erected state.

FIG. 1 is a perspective view of an exemplary portable toothbrush holder 100, depicted in an erected state. The holder has a base component 103 (or simply a base 103), a top component 101 (or simply a top 101), and a spindle 102 for connecting base component 103 and top component 101.

In the particular embodiment shown in FIGS. 1-4, the spindle 102 is an open ended, rigid tube having a circular cross-section. One of ordinary skill in the art understands that a portable toothbrush holder of the present invention is not limited to any particular construction or configuration of a spindle 102. In other embodiments, the spindle 102 is an elongated component such as a tubular or solid rod. Whether tubular (hollow) or solid, the cross section of the spindle 102 can be selected based on aesthetic preferences or structural preferences. For example, the cross section of the spindle 102 in the general horizontal plane when the portable toothbrush holder 100 is in the erected state and placed on a horizontal surface can be round, triangular, square, "I"-shaped, "+"-shaped (as depicted in the particular embodiment shown in FIGS. 5-10), "L"-shaped, or any other regular or irregular polygon, as well as other shapes.

Returning to FIG. 1, an end of the spindle 102 may be slidably received into a cavity defined by a top connection ring 112 (see FIG. 2) located on the underside of top component 101. The spindle 102 may fit snugly into the top connection ring 112 such that the top component 101 will not inadvertently decouple from the spindle 102 until the user desires to disassemble the portable toothbrush holder embodiment. It will be understood by one of ordinary skill in the art that this type of insertion fit, also known as a "slip fit" or "interference fit", can provide a cost effective and simple method for connecting components and, as such, may be leveraged in some embodiments of a portable toothbrush holder.

Moreover, it is understood by one of ordinary skill in the art that the spindle 102 may comprise additional features that complement/facilitate the insertion fit between components of the portable toothbrush holder in the erect state. For example, the shape/spatial configuration defined by the surface of the spindle 102 at the point of contact with top component 101 may maximize the surface area and, therefore, maximize the friction between the components. The "+"-shape, "L"-shape, or any other shapes of the cross section of the spindle 102 as described herein, may provide these benefits.

Figure 6:
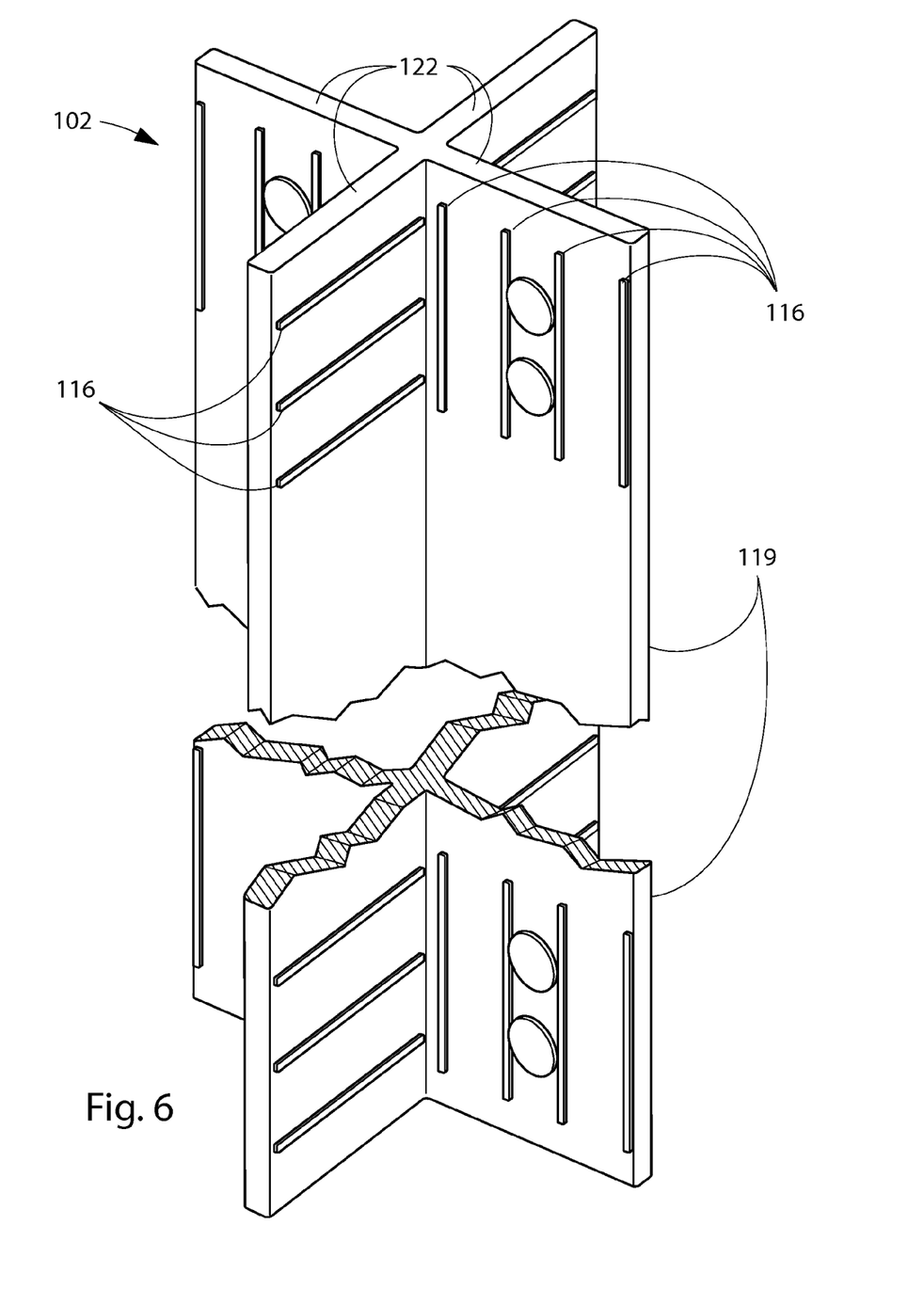
FIG. 6 is a truncated view of the opposite ends of an exemplary spindle for the portable toothbrush holder of FIG. 5.

Similarly, spindle 102 may comprise surface features, in addition to or separately from the shape/spatial configuration, that maximize the friction between the components and, therefore, optimizes the insertion fit between components. For example, as depicted in FIG. 6, this particular embodiment of spindle 102 comprises ridges 116 situated along the surface of its terminal ends 119 such that the spindle 102 fits more snugly into the top connection ring 112 when the top component 101 is detachably coupled to the spindle 102. It will be understood by one of ordinary skill in the art that these types of surface features also can provide a cost effective and simple-to-produce method for augmenting the insertion fit between components and, as such, may be leveraged in some embodiments of a portable toothbrush holder.

Figure 5:
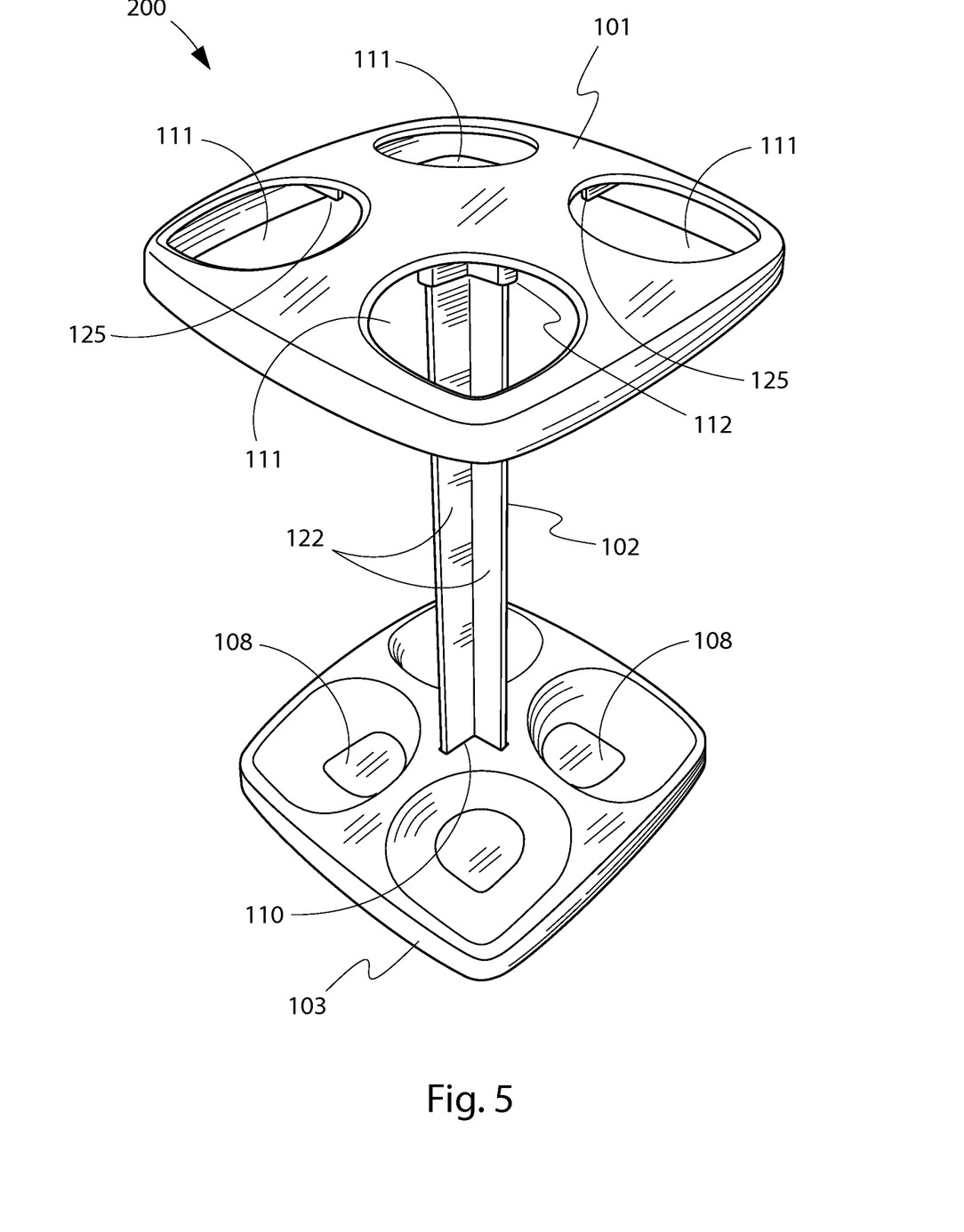
FIG. 5 is a perspective view of another exemplary portable toothbrush holder, depicted in an erected state.

Moreover, it also will be understood that the top connection ring 112 need not be ring-shaped, particularly if the spindle 102 is not round in cross section. For example, if the spindle 102 is a solid "+"-shaped elongated member, as depicted in FIG. 5, the top connection ring 112 will have a corresponding "+"-shaped outer wall surrounding a "+"-shaped interior wall into which the "+"-shaped spindle 102 will fit. Similar corresponding configurations will be used for triangular, square, "I"-shaped, "L"-shaped, or other regular or irregular polygon, as well as other shapes of spindles 102.

It also will be understood by one of ordinary skill in the art that a portable toothbrush holder is not limited to leveraging insertion fits for connection of the various components. It is envisioned that some embodiments of a portable toothbrush holder may leverage other connection techniques for coupling and decoupling components such as, but not limited to, fasteners, magnets, etc.

Similar to that which has been described relative to the connection between spindle 102 and top component 101, the opposite end of the spindle 102 may connect to the base component 103. In the exemplary FIG. 1 embodiment, the base connection ring 110 is slidably received into the inner diameter of the spindle 102.

Notably, the manners described above for connecting the spindle 102 to the top connection ring 112 and the base connection ring 110 are generally understood as "male to female" mechanical connections and are offered for exemplary purposes only. That is, it is envisioned that other means for connecting top component 101 and base component 103 to spindle 102 such as, but not limited to, threaded connections may be included in other embodiments of a portable toothbrush holder and, as such, the particular embodiment described relative to FIG. 1 will not limit the scope of the disclosure. For example, the spindle 102 may screw or clip onto the top component 101 and base component 103. Moreover, the top component 101, base component 103, and spindle 102 are shown and described as being circular. One of ordinary skill in the art will recognize that geometry of the various components may vary according to different embodiments of a portable toothbrush holder such as, for example, the outer circumference of the receiving feature of a component in other embodiments may be square, triangular, hexagonal, or oval.

In the particular embodiment shown in FIGS. 1-4, the top component 101 is shown with a female mechanical connection and the base component 103 is shown with a male mechanical connection, while the spindle 102 has a male mechanical connection on a first end to cooperate with the top component 101 and a female mechanical connection on a second end to cooperate with the base component 103. If male and female mechanical connections are used, it will be understood that each of the components, top component 101, spindle 102, and base component 103, can have either a male or female mechanical connection, so long as the connections between the spindle 102 and the top component 101 and the base component 103 cooperate with each other. This can best be seen in the particular embodiment shown in the FIGS. 5-10.

Returning to the exemplary portable toothbrush holder embodiment shown in FIG. 1, the base component 103 features a circular depression defined by an outer circumferential wall 109. Advantageously, the depression feature defined by wall 109 creates a space in which to hold the handle of a toothbrush and to prevent the toothbrush from sliding off of the base component 103. Additionally, the exemplary embodiment includes a base component 103 featuring radial ridges 107 that effectively partition the depression defined by wall 109 into a plurality of sections 108 that may serve to segregate the handles of multiple toothbrushes, thus preventing the toothbrushes from coming into contact with one another. Notably, the top component 101 may include either one or a plurality of openings 111 to receive the handles of one or a plurality of toothbrushes. Advantageously, these openings 111 allow the toothbrushes to be secured from the bristle ends such that the brushes rest in a substantially vertical position and remain segregated while drying.

Base component 103 has a shaped surface, which, in the illustrative embodiment shown in FIG. 1, resembles somewhat an undulation or volcano. In the center of base component 103 is base connection ring 110. Extending radially from base connection ring 110 are radial ridges 107. Radial ridges 107 end at outer circumferential wall 109. Optional drainage holes (not shown) can be located in the saddle between base connection ring 110 and outer circumferential wall 109 between radial ridges 107. A toothbrush placed in the holder 100 handle side down will rest in the saddle between base connection ring 110 and outer circumferential wall 109 between radial ridges 107. More specifically, the outer surface of base connection ring 110 and outer circumferential wall 109 will guide the handle of a toothbrush into the saddle where it will come to rest. The outer surface of base connection ring 110 and the outer circumferential wall 109 will maintain a toothbrush at a specific radial distance from the center of base component 103, and radial ridges 107 will maintain a toothbrush in a specific section of the base component 103. The radial distance defined by the saddle is such that a toothbrush will be maintained at a specific generally upright angle so as to help prevent holder 100 from tipping over and to help direct water and or other liquids to any drainage holes (not shown) present. Such a distance can be variable and can be anywhere along base component 103 depending on the desired angle and the size of the holder 100. Radial ridges 107 help prevent multiple toothbrushes from touching each other within holder 100 and from moving about saddle. The number of radial ridges 107 is variable, from none to as many will structurally fit on base component 103.

Base component 103 also can be structured from a molded planar piece of material or from a monolithic slab of material to have individual depressions as the sections 108. In such an embodiment of base component 103, as depicted in FIG. 5, the individual depressions are analogous to the two or more sections 108 formed by the combination of the circular depression, the outer circumferential wall 109, and the radial ridges 107. For example, bottoms of the depressions correspond to the circular depression, one or more outer walls of the depressions correspond to the outer circumferential wall 109, and one or more side walls or inner walls of the depressions located between adjacent depressions correspond to the radial ridges 107. Thus, by analogy the radial ridges 107 that effectively partition the depression defined by wall 109 into a plurality of sections 108 are merely formed by the undepressed portion of the base component 103 between depressions, and the wall 109 is merely formed by the undepressed portion of the base component 103 between the depressions and the outer edge of the base component 103.

Similarly, base component 103 also can be structured from a molded planar piece of material or from a monolithic slab of material to have a central depression, or slot, as the base connection ring 110. In such an embodiment of base component 103, as depicted in FIG. 5, the central slot is analogous to the "female"-type base connection ring 110. For example, like the "female"-type base connection ring 110, the "central slot"-type base connection ring 110 functions to facilitate the detachable coupling between the spindle 102 and the base component 103. Like the plurality of sections 108, the "central slot"-type base connection ring 110 is defined by a centralized depressed portion, between the individual depression sections 108, of the base component 103.

Figure 2:
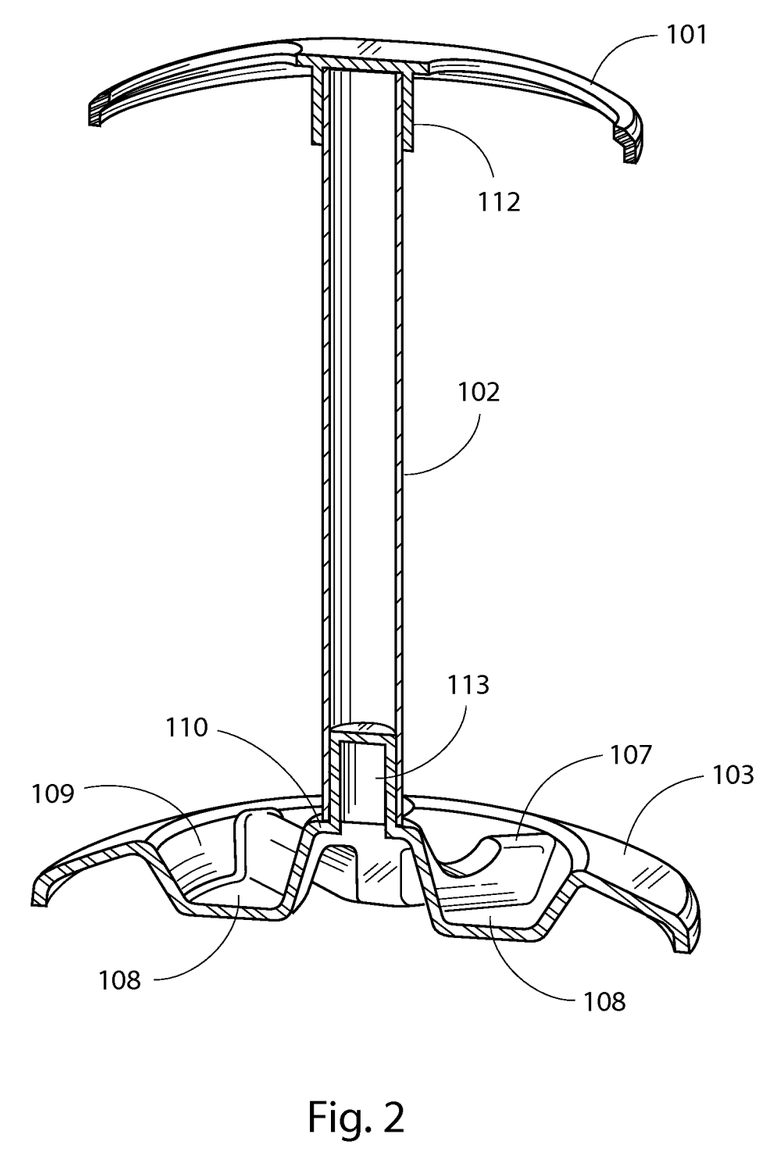
FIG. 2 is a perspective, cutaway view of the portable toothbrush holder of FIG. 1.

FIG. 2 is a perspective, cutaway view of the exemplary portable toothbrush holder 100 of FIG. 1. In the FIG. 2 illustration, spindle 102 can be seen as inserted into a female receiving feature of top connection ring 112. Similarly, a male connecting feature 113 of bottom connection ring 110 can be seen inserted into the inner diameter of spindle 102. Again, these connection mechanisms are offered for exemplary purposes only and will not limit the scope of the invention. Additionally, sections 108, as defined by partitions 107 through the base depression defined by wall 109, can be seen. Notably, it is envisioned that some embodiments of a portable toothbrush holder my include a drain hole or "weep" feature (not shown) in the bottom of sections 108 such that moisture may drain away from a received toothbrush.

Figure 3:
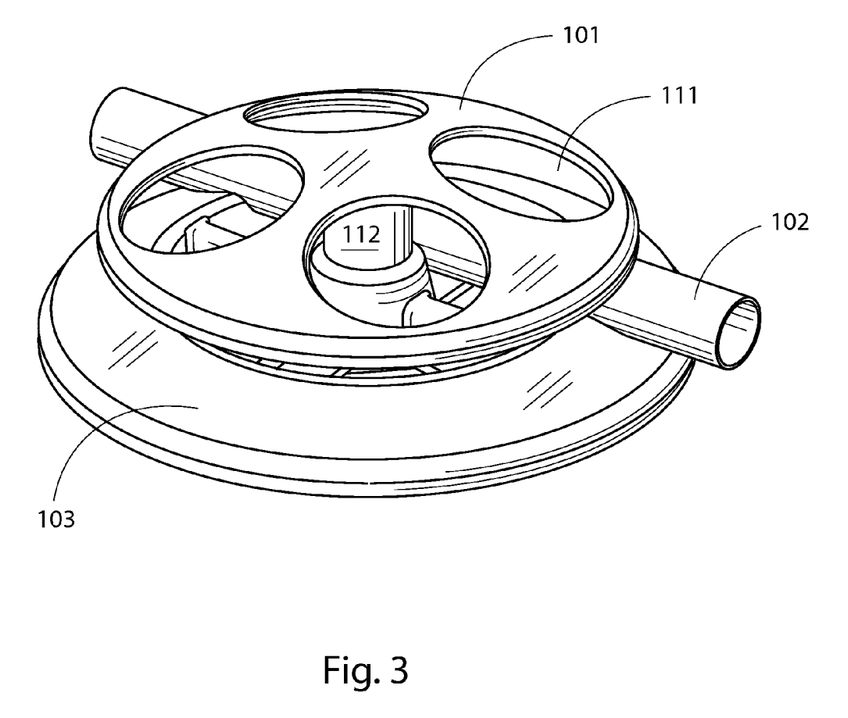
FIG. 3 is a perspective view of the exemplary portable toothbrush holder of FIG. 1, shown in a storage state.

FIG. 3 is a perspective view of the exemplary portable toothbrush holder 100 of FIG. 1 shown in a collapsed, storage state. As can be seen in FIG. 3, the top component 101 has been disassembled from the spindle 102 and connected to the base component 103 for storage or transportation. The top component 101 and the base component 103 are detachably coupled and stacked. Advantageously, when in a storage state, an embodiment of a portable toothbrush holder is conveniently compact and easily transported. While in this travel state, the top component 101 of some embodiments may connect to the base component 103 via the same insertion connections of the top and base connection rings 110, 112 described above (more easily seen in FIG. 4). In certain embodiments, the insertion fit strategy described herein facilitates the connection between the base component 103 and the top component 101.

Other embodiments of a portable toothbrush holder may have alternate means of connecting the top component 101 to the base component 103 including, but not limited to, screw connections, straps, or clip connections. Furthermore, it is envisioned that in certain embodiments the top component 101 is stacked upon the base component 103, the base component 103 is stacked upon the top component 101, or some intermediate component exists between the stacked top component 101 and base component 103. In yet other embodiments, the top component 101, the spindle 102, and the base component 103 remain unconnected in the storage state. In yet other embodiments, the top component 101 and the base component 103 connect, while the spindle 102 remains unconnected (see FIGS. 8-9)

Figure 4:
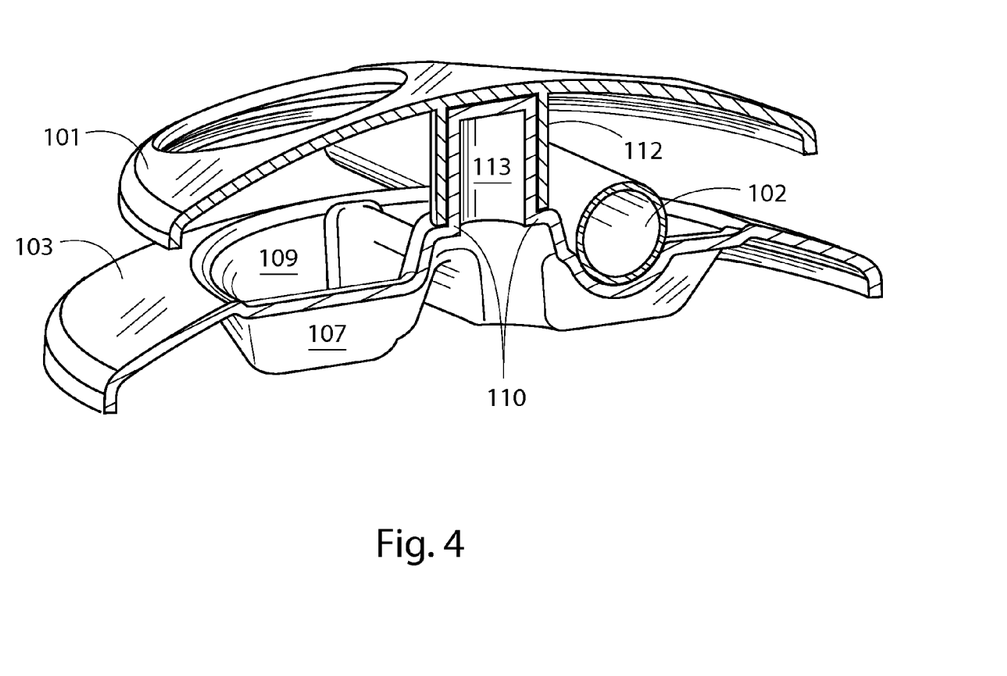
FIG. 4 is a perspective, cutaway view of the portable toothbrush holder of FIG. 3.

FIG. 4 is a perspective, cutaway view of the portable toothbrush holder 100 in a collapsed, storage state ready for transport. As can be seen in FIG. 4, the exemplary portable toothbrush holder 100 may accommodate the decoupled spindle 102 between top and base components 101, 103 while in the travel state. Briefly referring back to FIG. 1, the base component 103 of the exemplary embodiment 100 as shown includes saddles 104, 105, 106, which may serve to accommodate the spindle 102 when the portable toothbrush holder 100 is in the storage state. In some embodiments, the saddles 104, 105, 106 may be of a depth that allows the spindle 102 to be firmly compressed between the top component 101 and the saddle 104, 105, 106 such that the spindle 102 will not be dislodged during normal transport conditions. The saddles 104, 105, 106 may be of a circular shape matching the radius of the spindle 102. A person of ordinary skill in the art, however, would recognize that in other embodiments the saddles 104, 105, 106 may, by necessity, be of a shape more suited to accommodate an alternate geometry of the spindle 102. Saddles 104, 105, 106 are optional as the top component 101, the spindle 102, and the base component 103 can remain unconnected in the storage state and merely placed loosely into a travel bag.

Alternatively, the base component 103 can be structured to be of a size and shape such that it can fit within the top component 101 in a more compact storage state. This is considered to be a variation of the "stacked" configured described herein. For example, top component 101 and base component 103 can be of the same relative shape but with top component 101 having a slightly larger or smaller dimensional width and length, or diameter, dependent on the shape of the top and base components 101, 103, such that the outer perimeter of base component 103 can fit within the inner perimeter of top component 101 (as can be seen in the particular embodiment of FIGS. 8-9) or the outer perimeter of top component 101 can fit within the inner perimeter of base component 103, respectively, in the storage state, like a lid on a box.

It is an advantage of some embodiments of a portable toothbrush holder that the holder be constructed of a material that is safe for sanitizing and cleaning such as in a dishwasher. It would be apparent to one of ordinary skill in the art, however, that there are a variety of plastics and other similar materials well suited as a material of construction for a device that may be cleaned via exposure to high temperatures and/or steam and, as such, the particular material or materials used to construct a given portable toothbrush holder will not limit the scope of the disclosure. "Dishwasher safe" materials that may be used to construct a given portable toothbrush holder include, but are not limited to, polypropylene, polystyrene, and low-density polyethylene. Further, it also is envisioned that some embodiments of a portable toothbrush holder may be constructed of a material that one of ordinary skill in the art would recognize as disposable. That is, some embodiments of a portable toothbrush holder may be constructed of a material that cannot be properly sanitized and, as such, would be well suited for recycling or disposal after limited use. Materials for such a disposable embodiment include, but are not limited to, polyethylene terephthalate, high-density polyethylene, and paperboard.

In use, if the portable toothbrush holder 100 of FIGS. 1-4 is in its storage state, the user may decouple the top component 101 from the base component 103. With the portable toothbrush holder decoupled, the user may remove the spindle 102 from the saddle features 104, 105, 106 of the base component 103. Subsequently, the user may assemble the portable toothbrush holder by connecting the spindle 102 with the top component 101. The user then may connect the spindle 102 with the base component 103, and the portable toothbrush holder 100 is assembled and ready for use. Consequently, the user may insert one or more toothbrushes into the portable toothbrush holder, as was described relative to FIGS. 1-4.

If the portable toothbrush holder 100 is in an assembled, erected state, the portable toothbrush holder may have one or more toothbrushes inserted into it. Consequently, toothbrushes may be removed from the portable toothbrush holder 100. Once toothbrushes are removed, the user may begin disassembly of the portable toothbrush holder 100 by decoupling the top component 101 from the spindle 102. The user may decouple the spindle 102 from the base component 103. Notably, an exemplary portable toothbrush holder may be completely deconstructed into its various components; however, one of ordinary skill in the art will recognize that not all embodiments of a portable toothbrush holder may require complete deconstruction in order to transform between states. The disconnected spindle 102 may be placed into the saddle features 104, 105, 106 of the base component 103. The top component 101 may be coupled to the base component 103 (as seen in FIGS. 3-4). Further, the spindle 102 may be compressed into the saddle features 104, 105, 106 by the top component 101 to secure it for storage and transport. Moreover, it is envisioned that in some embodiments of a portable toothbrush holder the top component 101 may include complimentary saddle features positioned to receive the spindle 102 in conjunction with the saddle features of the base component. As such, one of ordinary skill in the art will recognize that the number of saddle features, position of saddle features and/or shape of saddle features may vary according to embodiments of a portable toothbrush holder and, although such features may be novel, are not limiting on the scope of the present disclosure. Likewise, the saddle features are optional and embodiments of the invention may not include saddle features.

The assembled holder 100 preferably is between about 3.5 to 6.0 inches high and has diameters between about 2.5 to 4.0 inches, which is based on the size of the typical toothbrush and the typical bathroom counter. Larger and smaller dimensions are suitable.

The holder 100 can be made of many different materials, with plastics, papers, sugars, and starches being preferred. In an embodiment where the holder 100 is disposable, easily degrading materials are preferred, as well as thinner materials.

In use, the assembled holder 100 can be placed on a surface and be used for supporting toothbrushes. The holder 100 can be supplied by an innkeeper or the like to patrons, can be purchased by the ultimate user for personal use, can be given out or sold by commercial entities with advertising thereon for promotional purposes, as well as used in many other ways. Additionally, the holder 100 can be bagged, wrapped or otherwise packaged, for sanitary purposes, which covering also can include advertising, designs or the like. As the holder 100 can be broken down into its component parts, top component 101, spindle 102, and base component 103, and placed in the transportation or storage state, it is easy to ship and to store. At the location of use, the holder 100 can be assembled. After use, the holder 100 can be rinsed and reused, discarded or, preferably, recycled.

FIG. 5 is a perspective view of another exemplary portable toothbrush holder 200 depicted in an erected state. The holder has a base component 103, a top component 101 and a spindle 102 for connecting base component 103 to top component 101. The top component 101 and the base component 103 are shown with a female mechanical connection. The spindle 102 is shown with a male mechanical connection on its terminal ends 119 to cooperate with the top component 101 and the base component 103. The top component 101 also is shown to comprise tabs 125. Tabs 125 may facilitate the detachable coupling between the top component 101 and the base component 103 when the portable toothbrush holder 200 is in a collapsed, storage state ready for transport. There typically is a space between the tab 125 and an inner periphery of the top component 101 to facilitate the stacking and coupling of the top component 101 to the bottom component 103.

More specifically, the spindle 102 is a substantially solid beam having a "+"-shaped cross-section with terminal ends 119. The flanges 122 define a "+"-shaped cross-section along a majority of the spindle 102; especially, along the terminal ends 119. The terminal ends 119 are configured to function as the male mechanical connections. Furthermore, it is envisioned that the flanges 122 may define various shapes and spatial configurations for the spindle 102 not depicted within the figures.

One of ordinary skill in the art understands that this particular embodiment of the spindle 102 can be, but is not limited to, extrusion molding. Extrusion molding, however, is leveraged in certain embodiments of the toothbrush holder because of the economic (cost-effective) and manufacturing (simple-to-make) benefits of extrusion molding.

In the erected stated, an end of the spindle 102 is slidably received into a cavity defined by the top connection ring 112 located on the underside of top component 101. Because the spindle 102 has "+"-shaped terminal ends 119, the top connection ring 112 has a corresponding "+"-shaped outer wall surrounding a "+"-shaped interior wall into which the "+"-shaped spindle 102 fits. The same is true for the base component 103. The spindle 102 fits snugly into the top connection ring 112 and/or base connection ring 110 and is retained by the insertion fit strategy described herein. Complementing the insertion fit, the spindle 102 has the "+"-shaped cross-section throughout its length, especially at the point of contact with top component 101 and base component 103. The "+"-shaped cross-section may maximize the surface area and, therefore, maximize the friction between the components.

As is depicted in FIG. 6, the spindle 102 also can comprise linear ridges 116 situated along the surface of the flanges 122 at the terminal ends 119. In this particular embodiment of spindle 102, the ridges 116 situated along the surface of one flange 122 are all aligned parallel to one another. The adjacent flange 122 also has ridges 116 aligned parallel to one another; however, these ridges 116 are perpendicular to the ridges 116 of the first flange 122. One of ordinary skill in the art understands that spindle 102 is not limited to this type of relationship between ridges 116 and flanges 122. Various other combinations of ridges 116 and flanges 122 (in terms of the shape of the ridges 116, the alignment of ridges 116 on the same flange 122, the orientations of ridges 116 from one flange 122 to another, etc.) are envisioned.

Returning to the exemplary portable toothbrush holder 200 embodiment shown in FIG. 5, the base component 103 is a molded planar piece of material, or a monolithic slab of material, structured to feature depression-type sections 108. Advantageously, the depression-type sections 108 create individual partitions configured to hold the handle of a toothbrush, prevent the toothbrush from sliding off of the base component 103, and segregate the handles of multiple toothbrushes from coming into contact with one another. Notably, the top component 101 also defines a plurality of openings 111 to receive the handles of one or a plurality of toothbrushes. Advantageously, these openings 111 allow the toothbrushes to be secured more proximal to the bristle ends such that the brushes rest in a substantially vertical position and remain segregated while drying.

Preferably, openings 111 have a somewhat teardrop shape, with a narrow part of the teardrop preferably proximal to the outer perimeter of the top component 101 and a rounded part of the teardrop preferably proximal to the center of the top component 101. It has been found that having the narrow part of the openings 111 towards the outer perimeter of the top component 101 causes or helps to cause a toothbrush located in the opening 111 to locate in the narrow part so as to lean outwards while being supported in the holder 200. This assists in keeping a plurality of toothbrushes located individually in each of the openings 111 from touching each other. As a result, when a plurality of toothbrushes are located in separate openings 111 of the holder 200, the toothbrushes are less likely to touch each other, which is more sanitary. Depression-type sections 108 also can have a similar teardrop shape.

Figure 7:
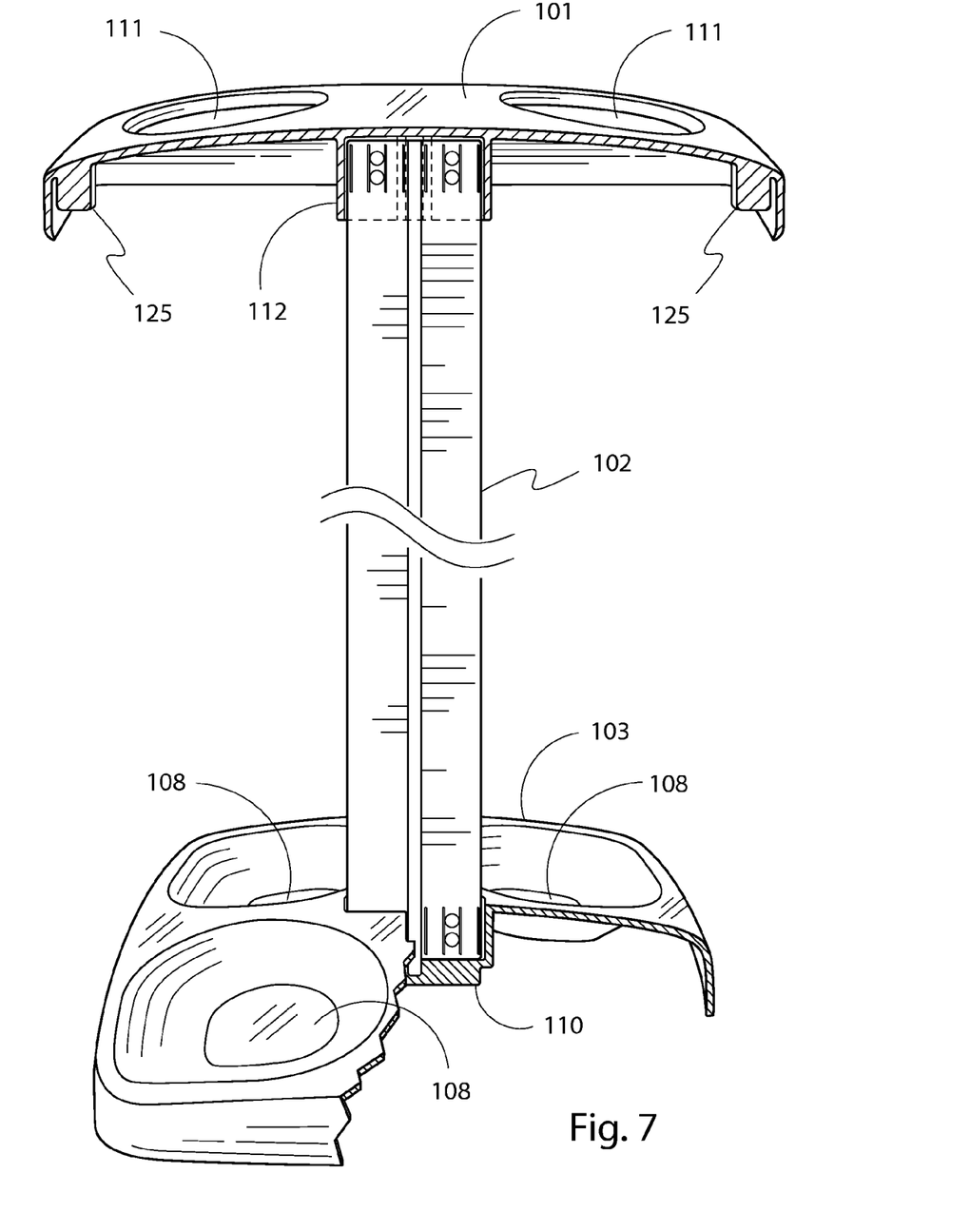
FIG. 7 is a perspective, cutaway view of the portable toothbrush holder of FIG. 5.

FIG. 7 is a perspective, cutaway view of the exemplary portable toothbrush holder 200. In the FIG. 7 illustration, spindle 102 can be seen as inserted into the female receiving features of top connection ring 112 and bottom connection ring 110. Also visible are tabs 125 adjacent to the outer periphery of the top component 101, which, in this particular embodiment, are situated diametrically opposed to one another. The top component 101 is not limited to the specific number or the exact position of the tabs 125 visible in FIG. 5 or 7. Instead, the top component 101 may comprise any number of tabs 125, each, at any location, so long as the tabs 125 define a path between the tabs 125 and the top component 101. In certain embodiments, the insertion fit strategy described herein facilitates the connection between the base component 103 and the top component 101.

Figure 8:
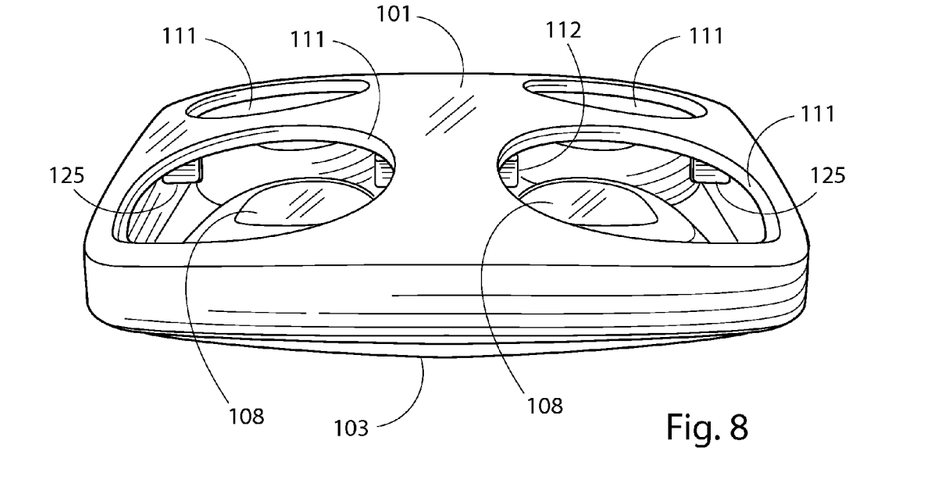
FIG. 8 is a perspective view of the exemplary portable toothbrush holder of FIG. 5, shown in a storage state.
Figure 9:
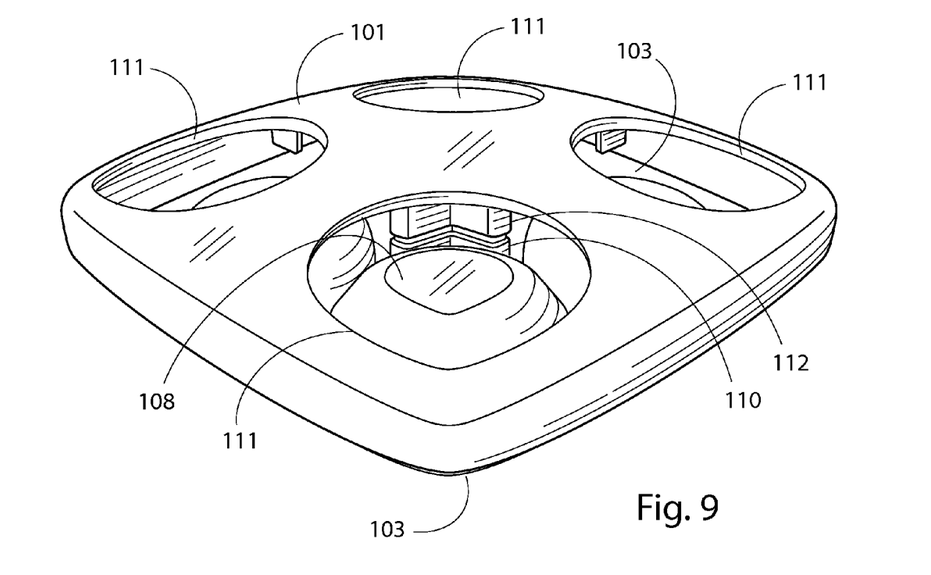
FIG. 9 is a perspective view of the exemplary portable toothbrush holder of FIG. 8, rotated 45 degrees.

Turning now to FIG. 8, a perspective view of the exemplary portable toothbrush holder 200 is shown in a collapsed, storage state. FIG. 9 shows the same exemplary portable toothbrush holder 200 as FIG. 8 but turned 45 degrees. As can be seen in FIGS. 8 and 9, the top component 101 has been disassembled from the spindle 102 and detachably coupled to the base component 103 for storage or transportation in a more compact state (See FIG. 10). The base component 103 is structured to be of a size and shape such that it can fit within the path 128 defined by the tabs 125 and the top component 101.

For this particular embodiment, top component 101 and base component 103 are of the same relative shape and top component 101 has a slightly larger or smaller dimensional width and length, or diameter, dependent on the shape of the components 101, 103, such that the outer perimeter of the base component 103 can fit within the inner perimeter of the top component 101. By doing so, the base component 103 nests, at least partially, within the top component 101 and is retained there by tabs 125, and, therefore, the insertion fit strategy described herein, as is understood by someone having ordinary skill in the art. This is considered to be a variation on the "stacked" configuration described herein. One having ordinary skill in the art also understands that tabs 125 are not limited to what is depicted in the drawings. Instead, the tabs 125 may be defined by various other shapes, spatial configurations, materials, etc.

Figure 10:
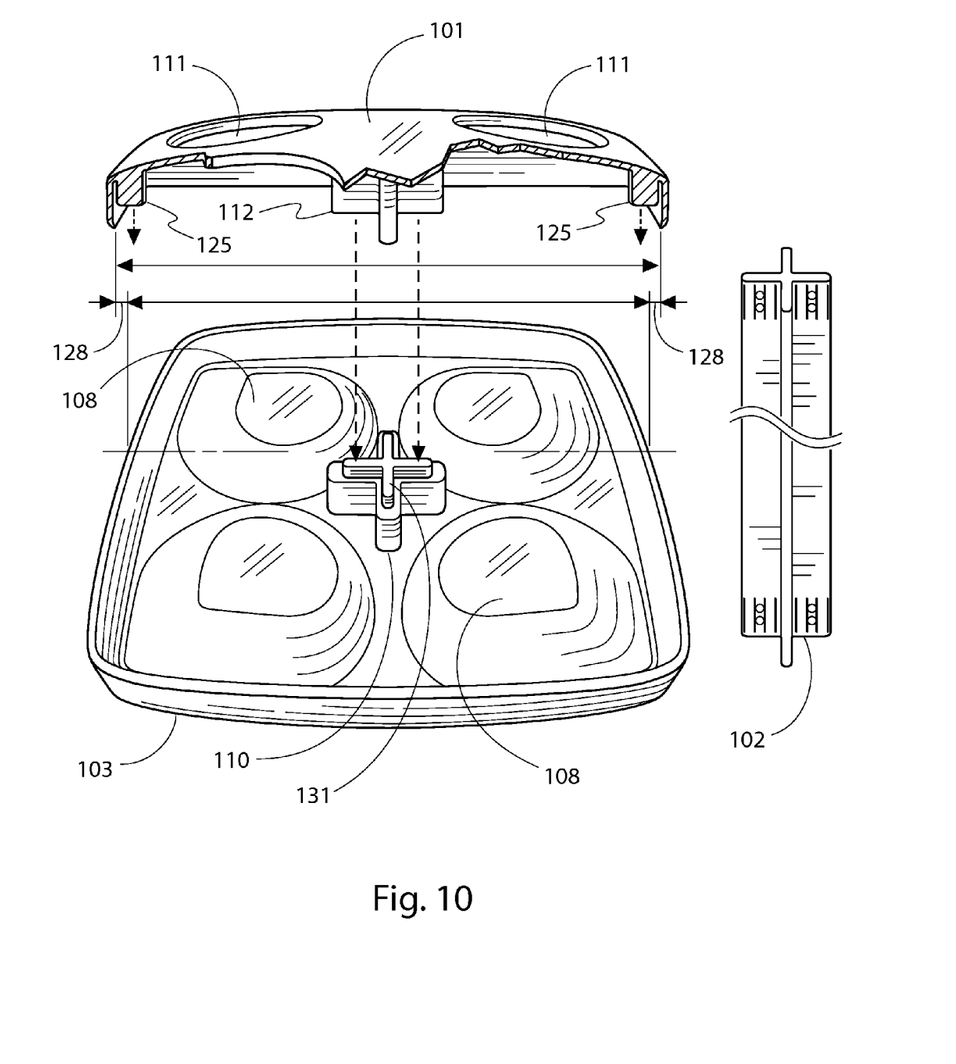
FIG. 10 is an exploded view of the portable toothbrush holder of FIG. 5.

Moreover, toothbrush holder 200 may not comprise tabs 125 at all. It is envisioned that various other similar mechanisms or structures may function in place of tabs 125 to either define a path between itself and the top component 101, in which case the base component 103 may enter, retain the base component 202 when nested, at least partially, within the top component 101, or both. Furthermore, tabs 125, or any similar mechanism/structure are not limited to being on or part of the top component 101. For example, as depicted in FIG. 10, base component 103 optionally may comprise a male connection portion 131 at a junction between the top component 101 and the base component when the two are nested in the collapsed, storage state. Male connection portion 132 in this particular embodiment is situated on the opposite side of the plane of the base component 103 defining the depression for the slot-type base connection ring 110. Male connection portion 131 is also configured, in shape and spatial orientation, to mimic the terminal ends 119 of the spindle 102 such that male connection portion 131 can retain, at least partially, the nested top component 101 and base component 103.

It will be appreciated by persons of ordinary skill in the art that a portable toothbrush holder is not limited by what has been particularly shown and described herein above. Rather, the foregoing detailed description of the preferred embodiments and the appended figures have been presented only for illustrative and descriptive purposes. They are not intended to be exhaustive and are not intended to limit the scope and spirit of the invention. The embodiments were selected and described to best explain the principles of the invention and its practical applications. One skilled in the art will recognize that many variations can be made to the invention disclosed in this specification without departing from the scope and spirit of the invention.

What is claimed is:

1. A portable toothbrush holder transformable between a first, storage state and a second, erected state, the portable toothbrush holder comprising:

a) a base having a spindle connection feature, at least one depression operable to receive at least one toothbrush handle, at least one partition feature that subdivides the at least one depression into a plurality of cavities each operable to receive the at least one toothbrush handle, and an outer wall surrounding the at least one depression;

b) a top having a spindle connection feature and a toothbrush retention feature comprising at least one opening operable for receiving the at least one toothbrush handle; and c) a spindle;

wherein the base, the top, and the spindle are separable from each other;

wherein the portable toothbrush holder is in the second, erected state when the spindle connection features of the base and the top receive opposite ends of the spindle in a vertical position to space the top from the base and enable the top and base to spin simultaneously with respect to a vertical axis of said spindle;

wherein the spindle connection feature of the base and the spindle connection feature of the top mate to couple the base to the top so that the top rests directly upon the base when the portable toothbrush holder is in the first, storage state;

wherein the base further comprises at least one saddle feature that forms a recess in said at least one partition or said outer wall, the recess of the at least one saddle feature is sized to receive the spindle, wherein the spindle is detached from the spindle connection feature of the base and the top, received by the at least one saddle feature and at least one of the plurality of cavities of the depression in a horizontal position, and retained in place by being wedged between the top and the base when the portable toothbrush holder is in the first, storage state; and wherein in the second, erected state at least one toothbrush is insertable into the portable toothbrush holder.

2. The portable toothbrush holder of claim 1, wherein the top is positioned substantially parallel to the base when the spindle connection feature of the top is in receipt of the spindle.

3. The portable toothbrush holder of claim 1, wherein the spindle connection feature is selected from the group consisting of a threaded connection, a slip fit connection, an interference connection, and a magnetic connection.

4. The portable toothbrush holder of claim 1, wherein the top, the base, and the spindle each are manufactured from a material selected from the group consisting of polypropylene, polystyrene, low-density polyethylene, polyethylene terephthalate, high-density polyethylene, and paperboard.

5. The portable toothbrush holder of claim 1, wherein the portable toothbrush holder is in the second, erected state the top and base are enabled to spin simultaneously with respect to a vertical axis of said spindle.

6. A portable toothbrush holder transformable between a first, storage state and a second, erected state, the portable toothbrush holder comprising:

a) a base having a top surface, a bottom side, and side walls extending between the top surface and the bottom side, wherein the side walls of the base define an outer periphery of the base, a post connection feature and at least one depression formed on the top surface of the base, the at least one depression operable to receive at least one toothbrush handle, wherein the bottom side of the base forms a hollow cavity; the post connection feature of the base comprises a recess that is formed through the top surface of the base and extends downwardly into the cavity of the base thereby defining a protruding male connection element;

b) a top having a top surface, a bottom side, and side walls extending between the top surface and the bottom side of the top, wherein the side walls of the top define an inner periphery of the top;

a post connection feature protruding downward from the top surface of the top, at least one tab protruding downward from the top surface of the top, and a toothbrush retention feature comprising at least one opening for receiving the at least one toothbrush handle, and a space between the at least one tab and the inner periphery of the top; wherein the post connection feature of the top comprises a slot defined therein; and c) an upright post that is removably connected between the post connection features of the top and the base in the second, erected state;

wherein the base, the top, and the spindle are separable from each other;

wherein the portable toothbrush holder is in the second, erected state when the post connection features of the base and the top receive opposite ends of the post in a vertical position to space the top from the base;

wherein the male connection element of the base mates within the slot of the post connection feature of the top, and at least one of the side walls of the base is inserted within the space between the at least one tab and the inner periphery of the top to couple the base to the top so that the top rests directly upon the base such that the base and the top are, at least partially, nested when the portable toothbrush holder is in the first, storage state; and wherein in the second, erected state the at least one toothbrush is insertable into the at least one opening of the top and extends downwardly into the at least one depression of the base.

7. The portable toothbrush holder of claim 6, wherein the post comprises a surface feature situated along each of the opposite ends of the post, the surface feature configured to facilitate, in the second, erected state, the retention of the opposite ends of the post within the post connection features of the base and the top.

8. The portable toothbrush holder of claim 6, wherein the surface feature situated along each of the opposite ends of the spindle is a plurality of parallel ridges.

9. The portable toothbrush holder of claim 6, wherein in the first, storage state the spindle connection feature of the base mates with the spindle connection feature of the top such that the base and the top remain nested.

10. The portable toothbrush holder of claim 6, wherein the top is positioned substantially parallel to the base when the post connection feature of the top is in receipt of the post.

11. The portable toothbrush holder of claim 6, wherein the top, the base, and the post each are manufactured from a material selected from the group consisting of polypropylene, polystyrene, low-density polyethylene, polyethylene terephthalate, high-density polyethylene, and paperboard.

12. The portable toothbrush holder of claim 6, wherein the at least one opening has a teardrop shape having a narrow part proximal to an outer perimeter of the at least one opening.

13. A combination of at least one toothbrush and a portable toothbrush holder, the at least one toothbrush comprising a toothbrush handle, and the portable toothbrush holder transformable between a first, storage state and a second, erected state, the portable toothbrush holder comprising:

a) a base having a spindle connection feature, a depression operable to receive the toothbrush handle, at least one partition feature that subdivides the depression into a plurality of cavities each operable to receive the toothbrush handle, and an outer wall surrounding said depression;
b) a top having a spindle connection feature and a toothbrush retention feature comprising a plurality of openings each of which is for receiving the toothbrush handle of the at least one toothbrush; and
c) a spindle;
wherein the base, the top, and the spindle are separable from each other;
wherein the portable toothbrush holder is in the second, erected state when the spindle connection features of the base and the top receive opposite ends of the spindle in a vertical position to space the top from the base and enable the top and base to spin simultaneously with respect to a vertical axis of said spindle;
wherein the spindle connection feature of the base and the spindle connection feature of the top mate to couple the base to the top so that the top rests directly upon the base when the portable toothbrush holder is in the first, storage state;
wherein the base further comprises at least one saddle feature that forms a recess in the at least one partition or the outer wall, the recess of the at least one saddle feature is sized to receive the spindle;
wherein the spindle is detached from the spindle connection features of the base and the top, received by the at least one saddle feature and at least one of the cavities of the depression in a horizontal position, and retained in place by being wedged between the top and the base when the portable toothbrush holder is in the first, storage state; and
wherein in the second, erected state the at least one toothbrush is insertable into the portable toothbrush holder.

\* \* \* \* \*